Figure 1:
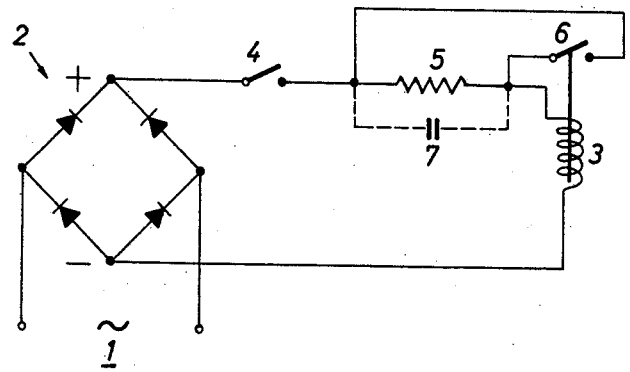

April 27, 1965 W. BINDER ETAL 3,181,039
ENERGIZING CIRCUIT NETWORK FOR ACTUATING MAGNETS
Filed April 21, 1961 3 Sheets-Sheet 1

Inventors
WILHELM BINDER
RUDOLF HAUER
HEINZ HAUG

By Toulmin & Toulmin
Attorneys

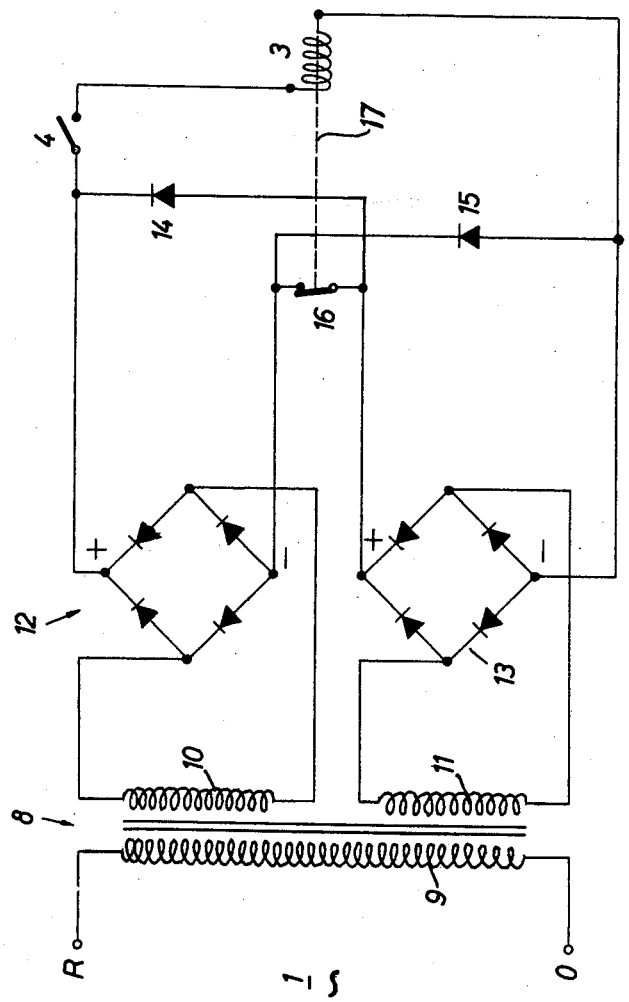

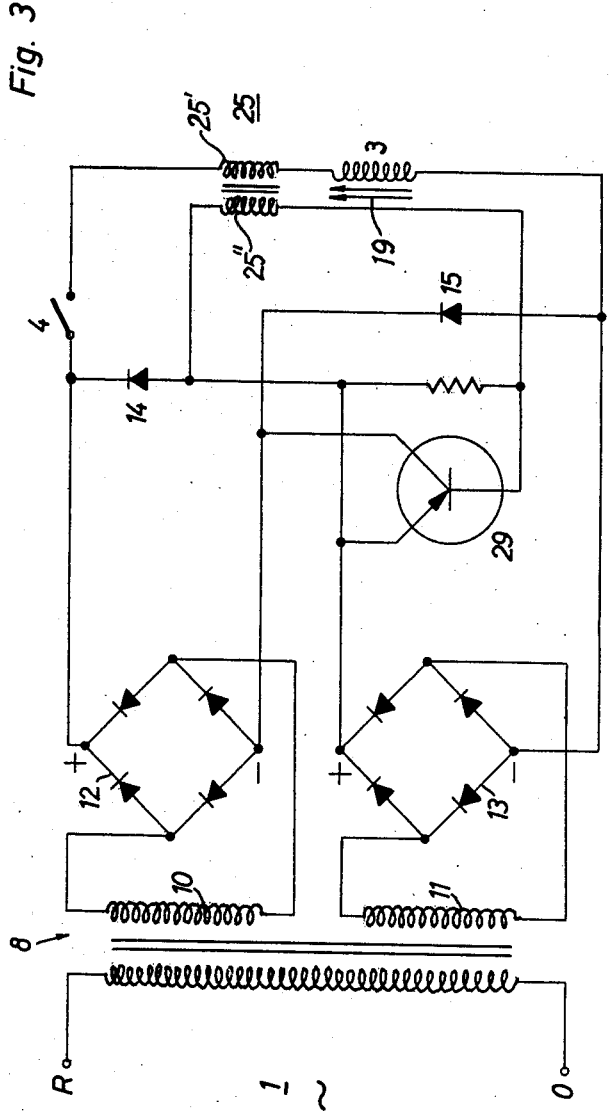

United States Patent Office 3,181,039
Patented Apr. 27, 1965

3,181,039
ENERGIZING CIRCUIT NETWORK FOR
ACTUATING MAGNETS
Wilhelm Binder and Rudolf Hauer, Villingen, Black
Forest, and Heinz Haug, Schwenningen (Neckar), Germany, assignors to Binder Magnete K.G., Villingen,
Black Forest, Germany
Filed Apr. 21, 1961, Ser. No. 128,279
Claims priority, application Germany, Apr. 23, 1960,
B 57,591
7 Claims. (Cl. 317—154)

The present invention relates to an electric circuit network for supplying an elecritc energizing current to a direct-current actuating electro-magnet from a source of alternating current.

The current required to hold the armature of a direct-current electro-magnet in the attracted position is only a fraction of the current required to attract and move the armature to the pole pieces. The additional power supplied in excess above that necessary to keep the armature in the attracted position is converted into heat in the magnet coils and represents a power loss. During continuous operation, undesired heating of the coils can thereby occur and in addition the current consumption is unnecessarily high.

To obviate these disadvantages, it is known to use a circuit network in which, after the armature has been attracted to the pole pieces, a series resistor is connected into the energizing circuit, thus reducing the voltage applied to the magnetizing circuit. In such a circuit network, however, a considerable portion of the power supplied is converted into heat in the series resistor, so that this resistor must be suitably dimensioned. Further, an arrangement is known in which a bridge type rectifier is connected in series with the energizing or exciter coil of the magnet and in which, after the attraction of the magnet armature, two of the four rectifier arms of the bridge circuit are disconnected by means of suitable switching elements. The arms which are disconnected correspond to the same half-wave circuit branch. At the same time, in one of the separated arms, a resistor is connected in parallel with the breaking point. This arrangement has the disadvantage that the magnet tends to hum after switching over to the holding voltage, especially when the armature is spring loaded initially in one direction. In addition, due to the high residual ripple of the half-wave direct current considerable heating occurs in the core and armature parts which in direct-current magnets are made of solid iron. In this known circuit, the additional resistor likewise consumes additional power.

It is an object of the present invention to provide an apparatus for supplying electric energizing current to direct-current operated actuating magnets from an alternating-current source in which these disadvantages do not occur.

The object is attained according to the present invention by providing a circuit network for supplying electric energizing current to direct-current actuating electro-magnets from an alternating-current source, which network comprises two separately-fed bridge type rectifiers normally connected in series circuit connection with the magnet coil and also comprising a switching element which, after the attraction of the magnet armature is completed, connects the two rectifier circuits in parallel with each other, whereby the power (stationary exciter current) supplied to the magnet coil at the end-of-stroke position is less than the power supplied during the stroke.

The invention will now be explained more fully by means of a number of constructional examples with reference to the accompanying drawings, in which:

FIG. 1 shows a circuit diagram such as has been used heretofore for feeding direct-current magnets, FIG. 2 illustrates a first embodiment of a circuit network according to the invention, and FIG. 3 illustrates another embodiment of the present invention.

In the several figures of the drawings, like parts are designated by the same reference numerals.

In FIG. 1, 1 denotes an alternating-current source, to which is connected a bridge type rectifier circuit 2. In series with a magnet coil 3 is a main switch 4, which serves for switching on the magnet, and a resistor 5. In addition, there is connected to the armature of the electromagnet a switch 6 which, when the armature has reached its end position, connects the resistor 5 in circuit for limiting the current supplied to coil 3. A capacitor 7 to be connected in parallel to the resistor instead of the switch 6 is also known.

FIG. 2 shows a first embodiment of the arrangement according to the invention. Here again, the source of current is denoted by 1 (terminals O–R). The source of A.C. voltage feeds a primary winding 9 of a transformer 8, which has two secondary windings 10 and 11 having preferably an equal number of turns. Connected respectively to the secondary windings 10 and 11 are bridge type rectifier circuits 12 and 13. Normally, i.e., when an actuating magnet 17 is de-energized the magnet or exciter coil 3 for atracting the actuating magnet 17 is connected in series with both of the rectifier circuits by means of respective half-wave rectifier elements 14 and 15. It is noted, that the plus pole of rectifier 13 has a junction with the anode of rectifying element 14, while the minus pole of rectifier 12 has a junction with the cathode of rectifying element 15.

Normally, i.e., when the magnet is *de-energized* and the armature is in dropped position, the main switch 4 is open and the additional switch 16 actuated by the armature of the magnet is closed so that the rectifiers 12 and 13 are connected *in series*.

To operate the magnet the main switch 4 is closed and, through the series connnection, a lifting force is applied until the attracted armature opens switch 16, thereby reducing the holding current by connecting the rectifiers 12 and 13 *in parallel*.

Upon switching off the magnet by opening the main switch 4, the armature drops again and, as it does so, it automatically closes the switch 16 so that the normal starting position is established once more.

A main switch 4 governing the current to coil 3 is normally open. There is also provided a switch 16 which when closed connects the two junctions just defined, and thereby the two circuits of the rectifiers 12 and 13 are placed in series circuit connection.

This switch 16 is normally closed, and it is operated by an armature energizable by the coil 3 of the electromagnet. For reasons of simplicity, this armature is shown combined with the actuating magnet 17.

In the resting position, that is to say when the switch 4 is open and the switch 16 is closed, the two rectifiers 12 and 13 are connected in series connection. When the coil 3 is energized by closing of the switch 4, current from the plus terminal of rectifier 12 flows by way of switch 4, coil 3, the minus terminal of rectifier 13, the plus terminal of rectifier 13, and switch 16 to the minus terminal of rectifier 12. The similar output voltages of the two rectifiers are thus added to each other; consequently, energizing coil 3 of the electromagnet is supplied with a double voltage.

As soon as the armature and magnet 17 has completed its stroke, it opens switch 16 and the rectifier circuits are connected in parallel. Two partial currents now flow to coil 3. One partial current flows from the plus terminal of rectifier 12 by way of switch 4, coil 3, and rectifier 15 to the minus terminal of rectifier 12, while the other partial current flows from the plus terminal of rectifier 13 by way of rectifier 14, switch 4, and coil 3 to the minus terminal of rectifier 13. After opening of switch 16, each rectifier supplies only about a quarter of the current supplied when the switch is closed, so that the current supplied to coil 3 is only half that supplied when switch 16 is closed.

As indicated in FIG. 3, the mechanical switch 16 of FIG. 2 may be replaced by an electronic switch, for example a transistor. As shown in FIG. 3, such an electronic transistorized switch 29 is arranged at the same place in the circuit as the mechanical switch 16. The control of this switch is effected by means of an additional transformer 25, the primary winding 25′ of which has only a small ohmic resistance and is connected in series with coil 3 of the magnet 19, indicated schematically only. The secondary winding 25″ of this transformer is used to control the electronic switching transistor 29.

It should be borne in mind that the current flowing through coil 3 is a direct current, so that secondary winding 25″ of transformer 25 is always without current when the direct current is not varied by and in coil 3. In secondary winding 25″, therefore, a voltage will be induced only while the current varies from zero to its end value during the switching on period of the electromagnet.

When switch 4 is open, no voltage is supplied across the base-emitter path of transistor 29. Practically no leakage current flows through the transistor because of the polarity of rectifiers 14 and 15, being reversely biased normally. When switch 4 is closed, a current builds up in magnet coil 3 as well as in the series connected transformer primary winding 25′ inducing a voltage in secondary winding 25″ and transistor 29 becomes conductive. The emitter-collector current through transistor 29 causes a reverse bias for the two rectifiers 14 and 15 and thus connects the two bridge rectifiers 12 and 13 in series circuit connection, applying double voltage as defined above to coil 3. When maximum exciter current level is reached transistor 29 becomes nonconductive, thus placing the bridge rectifiers in parallel circuit connection. The corresponding current drop in coil 3 and primary winding 25′ induces a voltage in secondary winding 25″ which voltage reversely biases the base-emitter path of transistor 29 thus remaining non-conductive.

The secondary winding 25″ of the transformer 25 remains without current whenever any end position of the magnet is reached, apart from the currents induced by ripple, so that the transistor remains non-conductive, the same effect being obtained thereby as in the opening of the mechanical switch 16 in the arrangement according to FIG. 2.

Practically no interruption occurs in the current in the magnet coil 3 upon switching over of the rectifier circuits. In this new arrangement, coil 3 receives a double voltage initially, since the two voltages of the rectifier circuits are similar and added together during the stroke. As soon, however, as the magnet has completed its stroke, the two rectifier circuits are connected in parallel, so that two partial currents are supplied to the magnet or its winding. After the switching-over operation, each rectifier supplies only about a quarter of the switch-on current, so that only half of the switch-on current is supplied to the magnet winding, this being sufficient to keep the armature reliably in its attracted position. Since the switch-on current in general flows only for a period of about 100–200 milliseconds, rectifiers and transformers can be overloaded during this period of time without danger; it is therfore not necessary to overdimension these components.

The invention is not limited to the embodiments described above but all changes and modifications thereof not constituting departures from the spirit and scope of the inventions are intended to be covered by the following claims.

W claim:

1. A circuit network for energizing D.C. voltage operated actuating electromagnets from an A.C. voltage source comprising; a magnet exciter coil actuating a magnet; an A.C. voltage source; a first and a second bridge type rectifier assembly each having circuit means connecting said A.C. voltage source; circuit means for connecting said rectifier assembly in parallel to said coil; and a switching arrangement responsive to the activation of said magnet for initially bridging said circuit means and thereby connecting said rectifier assemblies in series circuit connection and thereafter opening said bridging connection substantially when said magnet is actuated and has reached its actuated end position.

2. A circuit network for energizing D.C. voltage operated actuating electromagnets from an A.C. voltage source comprising; a magnet exciter coil actuating a magnet; an A.C. voltage source; a transformer having a primary winding having circuit means connecting said A.C. voltage source and having a first and a second secondary winding; a first and a second bridge type rectifier assembly each having a plus pole and a minus pole and circuit means connecting said first secondary winding with said first rectifier assembly and said second secondary winding with said second rectifier assembly; parallel circuit means including rectifying elements for connecting said rectifier assemblies at similar polarity to said magnet coil; a normally closed switch interconnecting said plus pole of said first rectifier assembly and said minus pole of said second rectifier assembly; and means operated by said magnet as actuated by said coil for opening said switch when said magnet has reached the actuated end position.

3. A circuit network for energizing an electromagnet comprising: an exciter coil; a first bridge type rectifier assembly; a first rectifying element connected with its cathode to the minus pole of said bridge type rectifier forming a first junction therewith; a second bridge type rectifier assembly; a second rectifying element connected with its anode to the plus pole of said second bridge type rectifier assembly forming a second junction therewith; means for connecting in parallel circuit connection: said coil, said first rectifier assembly with series connected rectifying element, and said second rectifier assembly with series connected rectifying element; and switching means for selectively interconnecting said two junctions.

4. A circuit network for energizing an electromagnet comprising: an exciter coil; a first bridge type rectifier assembly; a first rectifying element connected with its cathode to the minus pole of said bridge type rectifier assembly forming a first junction therewith; a second bridge type rectifier assembly; a second rectifying element connected with its anode to the plus pole of said second bridge type rectifier assembly forming a second junction therewith; means for connecting in parallel circuit connection: said coil, said first rectifier assembly with series connected rectifying element, and said second rectifier assembly with series connected rectifying element; and an electronic switching element interconnecting said two junctions.

5. A circuit network for energizing an electromagnet comprising an exciter coil; a first bridge type rectifier assembly; a first rectifying element connected with its cathode to the minus pole of said bridge type rectifier forming a first junction therewith; a second bridge type rectifier assembly; a second rectifying element connected with its anode to the plus pole of said second bridge type rectifier assembly forming a second junction therewith; means for connecting in parallel circuit connection: said coil, said first rectifier assembly with series connected rectifying element, and said second rectifier assembly with series connected rectifying element; a transistor having its collector-emitter path connected between said two junctions; and transformer means responsive to current changes in said exciter coil and being connected across the base emitter path of said transistor to render it conductive when the current in said coil increases.

6. A circuit network for energizing D.C.-voltage operated actuating electromagnets from an A.C. voltage source comprising: a transformer having a primary winding connected to an A.C. voltage source, and having two secondary windings; a first and a second bridge type rectifier assembly respectively connected to said two secondary windings; means, including series connected rectifying elements for connecting said rectifier assemblies at similar polarity to said magnet coil, whereby a first junction is defined between the plus pole of one rectifier assembly and the anode of one rectifying element and a second junction is defined between the minus pole of the other rectifier assembly and the cathode of the other rectifying element; a second transformer having its primary winding connected in series to said coil; a transistor having its base and emitter electrodes connected to the secondary winding of said second transformer and having its emitter-collector path connected between said first and second junctions, said transistor being conductive when the current in said coil increases, and non-conductive when such current is constant and when it decreases.

7. A circuit network for energizing D.C. voltage operated actuating electromagnets from an A.C. voltage source comprising: a transformer having a primary winding connected to an A.C. voltage source, and having two secondary windings; a first and a second bridge type rectifier assembly respectively connected to said two secondary windings; means, including series connected rectifying elements for connecting said rectifier assemblies at similar polarity to said magnet coil; and a transistor responsive for conduction to an increasing current in said coil and being connected between the plus pole of said first rectifier assembly and the minus pole of said second rectifier assembly for providing a current path therebetween when conductive.

References Cited by the Examiner
UNITED STATES PATENTS

| | | | |
|---|---|---|---|
| 2,033,070 | 3/36 | Hanley | 307—71 X |
| 2,897,413 | 7/59 | Hodges | 317—148.5 |
| 2,980,842 | 4/61 | Medlar | 307—71 X |

SAMUEL BERNSTEIN, *Primary Examiner.*